(12) United States Patent
Englert

(10) Patent No.: US 9,059,627 B2
(45) Date of Patent: Jun. 16, 2015

(54) PERMANENT MAGNET COUPLING

(75) Inventor: Thomas Englert, Grossostheim (DE)

(73) Assignee: RINGFEDER POWER-TRANSMISSION GMBH, Gross-Umstadt (DE)

(*) Notice: Subject to any disclaimer, the term of this patent is extended or adjusted under 35 U.S.C. 154(b) by 339 days.

(21) Appl. No.: 13/510,716

(22) PCT Filed: Dec. 2, 2010

(86) PCT No.: PCT/EP2010/068753
§ 371 (c)(1),
(2), (4) Date: Jun. 5, 2012

(87) PCT Pub. No.: WO2011/067344
PCT Pub. Date: Jun. 9, 2011

(65) Prior Publication Data
US 2013/0113317 A1 May 9, 2013

(30) Foreign Application Priority Data
Dec. 2, 2009 (EP) .................................... 09014932

(51) Int. Cl.
H02K 7/00 (2006.01)
H02K 1/06 (2006.01)
H02K 49/10 (2006.01)

(52) U.S. Cl.
CPC ............ H02K 49/102 (2013.01); H02K 49/106 (2013.01)

(58) Field of Classification Search
CPC .................................................... H02K 49/102
USPC .................................................. 310/103, 105
See application file for complete search history.

(56) References Cited

U.S. PATENT DOCUMENTS 6,841,910 B2 * 1/2005 Gery ........................ 310/156.43
2005/0040721 A1 * 2/2005 Kusase et al. ............. 310/156.43

FOREIGN PATENT DOCUMENTS

| FR | 2766027 A | 1/1999 |
| GB | 2240666 A | 8/1991 |
| JP | 01141206 B | 6/1989 |
| JP | 2001327154 B | 11/2001 |

* cited by examiner

Primary Examiner — Hanh Nguyen
Assistant Examiner — Leda Pham
(74) Attorney, Agent, or Firm — Andrew Wilford

(57) ABSTRACT

The invention relates to a permanent magnet coupling for the synchronous transmission of torque, comprising a first member (1) having permanent magnets (4a, 4b) and a second member (2), the members being designed as inner rotor and outer rotors and separated by an air gap (3) extending between the members (1, 2), wherein the members (1, 2) are coupled to enable a synchronous movement by forces generated by the permanent magnets (4a, 4b) by the interaction with the second member (2), wherein the first member (1) comprises a first group of permanent magnets (4a) having magnetizing directions parallel to the air gap (3) and a second group of permanent magnets (4b) having magnetizing directions perpendicular to the air gap (3), wherein the permanent magnets (4a, 4b) of the first group and of the second group of the first member (1) are alternately arranged in the circumferential direction, and wherein, as viewed in the circumferential direction, the consecutive permanent magnets (4a) of the first group and the consecutive permanent magnets (4b) of the second group have opposing magnetizing directions, respectively. According to the invention, the permanent magnets (4b) of the second group, starting from the air gap (3), are arranged offset toward the back with respect to the permanent magnet (4a) of the first group such that permanent magnet-free intermediate spaces (5), in particular made of soft iron, remain between the air gap (3) and the permanent magnet (4b) of the second group, said intermediate spaces being delimited laterally by the permanent magnets (4a) of the first group.

15 Claims, 3 Drawing Sheets

PERMANENT MAGNET COUPLING

CROSS REFERENCE TO RELATED APPLICATIONS

This application is the US-national stage of PCT application PCT/EP2010/068753 filed 2 Dec. 2010, published 9 Jun. 2011 as WO2011/067344, and claiming the priority of European patent application 09014932.9 itself filed 2 Dec. 2009.

FIELD OF THE INVENTION

The invention relates to a permanent-magnet coupling for synchronously transmitting torque with a first member having permanent magnets and a second member respectively forming an inner rotor and an outer rotor separated by an air gap extending between the members, where for synchronous movement the members are coupled by forces that are generated by the permanent magnets in interaction with the second member, the first member having a first array of first permanent magnets with magnetization directions running parallel to the air gap and a second array of second permanent magnets with magnetization directions running perpendicular to the air gap, the first and second permanent magnets of the first array and of the second array of the first member alternating angularly and as viewed in the circumferential direction the adjacent first permanent magnets of the first array as well as the adjacent second permanent magnets of the second array respectively having opposing magnetization directions.

BACKGROUND OF THE INVENTION

Permanent-magnet couplings make possible a wear-free and contact-free transfer of forces and torques across the air gap. The term air gap generally relates in a customary manner according to the art to the spacing formed between the members in a force transmission direction, in which for example a containment shell can also be provided to make possible a leakage-free seal between the members. Thus permanent-magnet couplings with a containment shell can be inserted in pumps, for example, where through the leakage-free transmission of force or torque increased safety is ensured by the spatial separation even with polluting, toxic or otherwise hazardous substances. Further fields of use are applications in which a force or torque limitation is necessary, where up to a predetermined force or a predetermined torque the members rotate synchronously or at least largely synchronously and the permanent-magnet coupling slips when the predetermined limit value has been reached. Such properties are an advantage in particular in the case of production machines and processing machines if, for example, an overload is to be avoided or for the production of a threaded connection a predetermined starting torque is to be maintained. Since the transmission of the torque or of the force takes place in a contact-free manner, the slipping does not lead to wear of the coupling, so that it is suitable for a long-term use under marked loads.

In order with torque-transmitting permanent-magnet couplings to generate the magnetic field across the air gap, it is known to align the permanent magnets provided on the members with their magnetization directions either parallel or perpendicular to the air gap. Corresponding alternative embodiments are known from FR 2 782 419 A1. This printed publication furthermore proposes to modulate the force acting between the members by the shape of the magnets in an angle-dependent manner.

It is known from the field of electromotive drives to make permanent magnets with different magnetization directions in the shape of a so-called Halbach array where the magnetic flux is reduced on the one side of the configuration and is intensified on the opposite side.

Permanent-magnet couplings with the features described at the outset are known from printed publications GB 2 240 666 A and US 2004/00066107 [U.S. Pat. No. 6,841,910]. The inner rotor and the outer rotor of the permanent-magnet couplings provided for transmitting torque are respectively formed by a first array of first permanent magnets and a second array of second permanent magnets that have magnetization directions extending perpendicular to one another. In order to impart a cylindrical shape to the first member and the second member, the permanent magnets have an extremely complex shape adapted to the respective diameter. Although with the permanent-magnet couplings as a whole a high flux density can be achieved, where the arrangement of reflux elements is not inevitably necessary either, the production is very complex and costly, since magnets of special shapes are necessary.

In addition to generic permanent-magnet couplings for synchronously transmitting torques, eddy-current couplings are also known that are based on a fundamentally different functional principle. An eddy-current coupling is described, for example, in JP 2001327154. Eddy-current couplings have a first member with permanent magnets and a second member of conductive material. Rotation of the first member causes the magnets to induce eddy currents in the conductive material of the second member and thus a certain counter magnetic field. So long as the second member can rotate, it will do so at a reduced speed. Magnetization does not remain in the conductive material of the second member. Instead, the induced field acts in the second member according to the different rotational speed between the first and the second member. Eddy-current couplings are thus based on the principle of an asynchronous transmission.

OBJECT OF THE INVENTION

Against this background the object of the invention is to provide a permanent-magnet coupling for the synchronous transmission of torques, whose compact structure renders possible the transmission of large torques or forces and that at the same time can be produced simply and cost-effectively.

SUMMARY OF THE INVENTION

Starting from a permanent-magnet coupling with the features described at the outset, the object is attained according to the invention in that the second permanent magnets of the second array starting from the air gap are set back with respect to the first permanent magnets of the first array so as to form between the air gap and the second permanent magnets of the second array spaces free of permanent magnets and laterally delimited by the first permanent magnets of the first array.

The arrangement of the magnets is carried out advantageously such that at the individual spaces the adjacent magnets point with like poles into the respective space. Compared to the known embodiments, the arrangement of the individual magnets around the spaces enlarges the surface available for the entry of the magnetic flux. With respect to the interaction with the second member, the individual spaces through the superimposition of the fields generated by the adjacent magnets form effective poles with increased flux density, where either the holding moments to be achieved can be increased or with a predetermined holding moment the installation size can be reduced.

Because according to the invention the spaces with the magnets adjoining them form an effective pole, a complex design of the individual magnets is not necessary to attain the object of the invention. In particular for the permanent magnets of the first array as well as of the second array of the first member simple parallelepipedal shapes can be provided. The permanent magnets produced, for example, by sintering and optionally customized to a predetermined measurement can thus be produced in a particularly cost-effective manner and without material losses. It is also possible to use commercially conventional standard measurements, so that overall very low production costs are achieved even with small series or individual manufacture. Since simple parallelepipedal magnets can be used to form the first member, a particularly flexible adjustment, for example, to different diameters is possible.

The spaces free of permanent magnets advantageously hold a filler material in order to achieve an advantageous spatial distribution of the magnetic flux. In particular a material with a high permeability, for example, a soft-magnetic material, can be provided. In particular soft iron is suitable, which can be present in the form of laminated electrical steel sheet. In addition to the embodiment of a desired field distribution, the filler material can also help to hold the magnets on the first member and to give the first member a uniform surface at the air gap.

Since within the scope of the embodiment according to the invention the permanent magnets of the second array are set back and all of the permanent magnets of the first member are shaped in an oblique manner preferably not in a complex manner, a not insignificant magnetic flux emerges on the side of the permanent magnets of the second array lying opposite the spaces. In order against this background to avoid magnetic losses and undesirable stray fields, a support is preferably provided for the permanent magnets as a reflux element. This support can be formed, for example, from a ferromagnetic material, for example, laminated electrical sheet steel.

Within the scope of the present invention, the second member can also have permanent magnets that interact through the air gap with the permanent magnets of the first member. As for the first member, the magnets can be made of conventional magnet materials, such as NdFeB, NeFeBo or SmCo. It is also advantageous with regard to the material selection that simple parallelepipedal magnets can be used, so that no special demands need to be made on the respective production method. The fixed geometry of the members with the described embodiment of the permanent-magnet coupling effects a completely synchronous transmission of the movement between the members directly up to the point of slipping.

For the arrangement of the permanent magnets of the second member, alignment in the conventional manner of all magnets with their magnetization direction perpendicular or parallel to the air gap can be provided. In order to be able to transmit particularly large forces or torques, however, also on the second member, an arrangement can be provided on the first member with a first array and a second array of second permanent magnets, wherein the permanent magnets of the first array and of the second array have different magnetization directions and wherein the previously described space free of permanent magnets remains between the permanent magnets.

According to an alternative embodiment of the invention, the second member has a magnetizable material that interacts with the permanent magnets of the first member.

The magnetizable material is preferably a hysteresis material in which remagnetization does not take place until a certain counterfield is present. Corresponding permanent-magnet couplings in practice are also referred to as hysteresis couplings. In the case of the transmission of small forces or torques, as with the embodiment previously described with permanent magnets on the first member and the second member, synchronous transmission of the force or of the torque occurs. Below the maximum nominal force to be transmitted or below the maximum nominal torque to be transmitted the magnetizable material is namely magnetized by the permanent magnets of the first member in a specific manner so that synchronous movement of the members then takes place. When the predetermined limit is approached, remagnetization of the hysteresis material begins and accordingly slipping of the coupling so that synchronous movement is then no longer present. Since the field distribution is not permanently established in the magnetizable material, a softer slipping behavior than with permanent-magnet couplings is usually observed, in which, as previously described, the second member is also equipped with permanent magnets. Magnetic hysteresis losses and thus also deceleration by conversion into thermal energy can be adjusted by the selection of the material. With deceleration by conversion into thermal energy, a sufficient cooling should also be provided with the design of the permanent-magnet coupling. As hysteresis material, for example, an AlNiCo material is suitable, such an alloy also containing iron (Fe), copper (Cu) and titanium (Ti) in addition to aluminum (Al), nickel (Ni) and cobalt (Co).

Finally, it is also possible for the second member to have permanent magnets as well as magnetizable material, so that the properties of the coupling can be adjusted more precisely according to requirements.

BRIEF DESCRIPTION OF THE DRAWING

The invention is explained below with reference to a drawing showing a single embodiment. Therein.

SPECIFIC DESCRIPTION OF THE INVENTION

Figure 1:
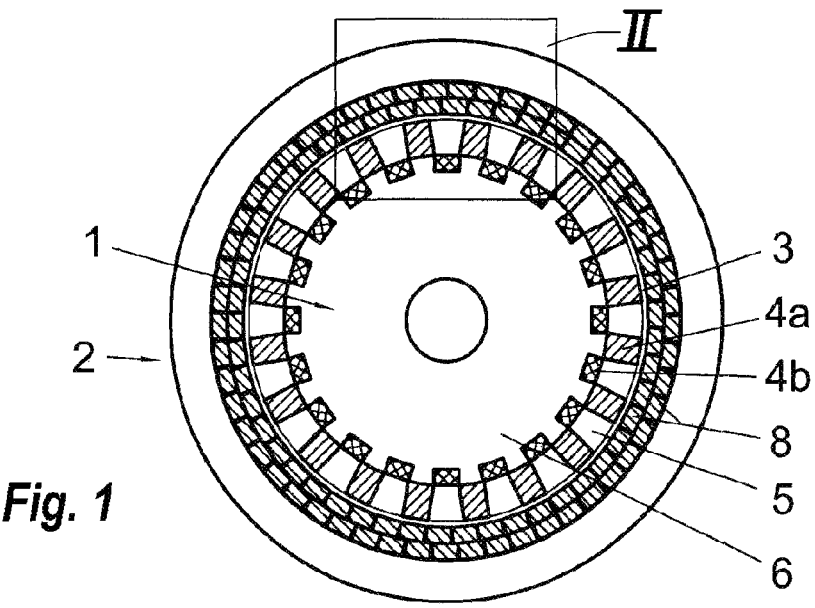
FIG. 1 is a diagrammatic section through a torque-transmitting permanent-magnet coupling.

FIG. 1 shows a torque-transmitting permanent-magnet coupling with a first member 1 forming an inner rotor and a second member 2 forming an outer rotor. Both members 1 and 2 are centered on and rotatable a common axis A (FIG. 3) and separated by an air gap 3. The first member 1 has a first array of first permanent magnets 4a as well as second permanent magnets 4b of a second array between these first permanent magnets 4a.

Figure 2:
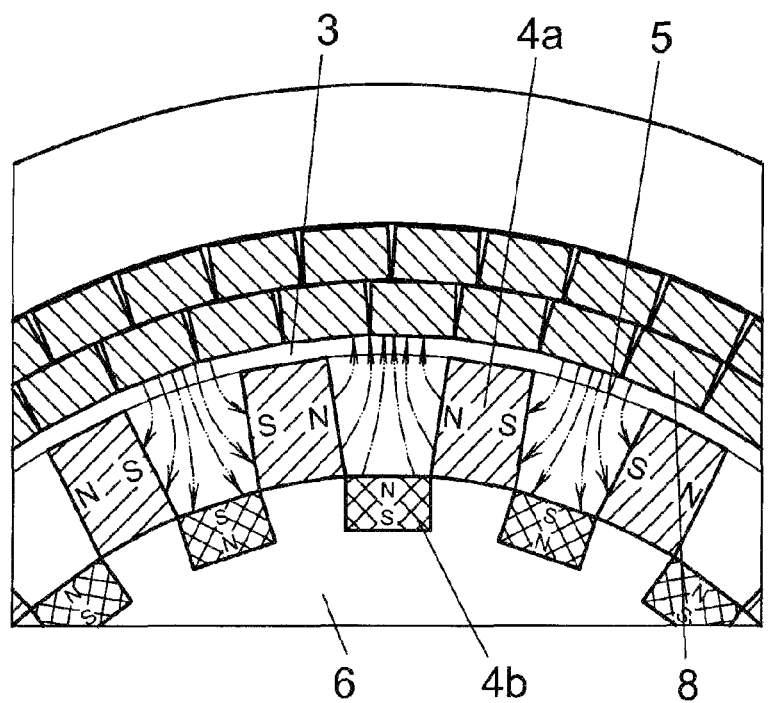
FIG. 2 is a detail of the section of FIG. 1.

The detailed view of FIG. 2 shows that the magnetization directions of the first array of first permanent magnets 4a extend angularly, parallel to the adjacent air gap 3, while the angularly interleaved magnets 4a of the first array have opposite angularly extending magnetization directions.

Starting from the air gap 3, the second permanent magnets 4b of the second array are set back relative to the permanent magnets 4a of the first array so as to leave between the air gap 3 and the second permanent magnets 4b of the second array spaces 5 free of permanent magnets that are radially inwardly delimited by the permanent magnet 4a of the first array. The magnetization directions of the second permanent magnets 4b of the second array are perpendicular to the air gap 3 such that on three faces of the individual spaces 5 the adjoining permanent magnets 4a and 4b either all adjoin with their north or with their south poles. This orientation of the spaces 5 and the superimposition of the fields of the adjoining permanent magnets 4a and 4b forms effective poles with increased flux density. This is attributable to the fact that the area available for the entry of the magnetic flux is maximized by the offset orientation of the second permanent magnets 4b of the second array. In order to achieve high field strengths and to avoid losses, the spaces 5 are filled with a soft magnetic material, for example laminated electrical-steel sheets. In addition the permanent magnets 4a and 4b are mounted on a support 6 that carries the first member and forms a reflux element.

The outer rotor as the second member 2 is covered with segments 8 of a hysteresis material, and to further increase the torque the segments are arranged in two rows one over the other.

Figure 3:
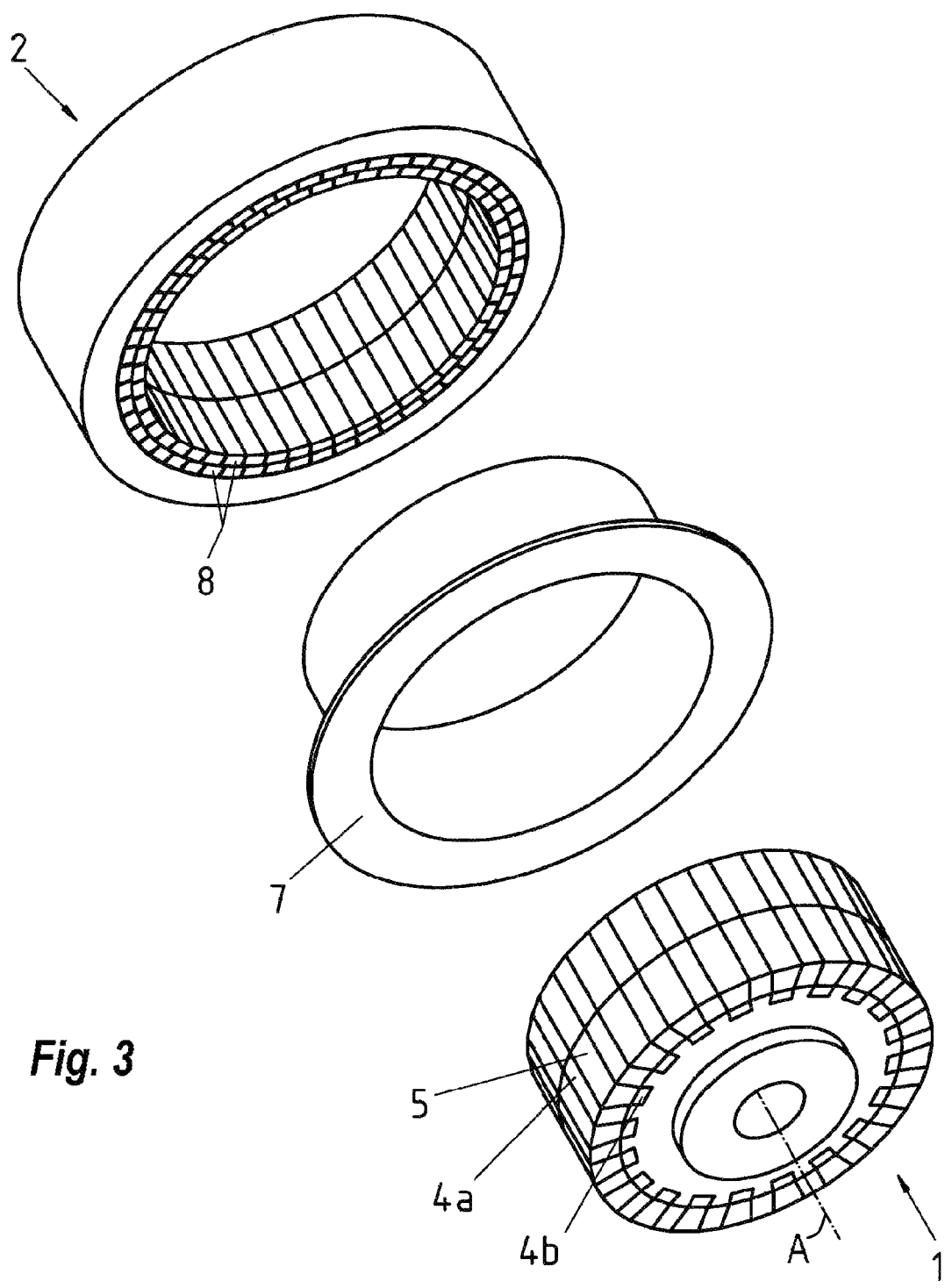
FIG. 3 is a perspective view of the parts of a permanent-magnet coupling.

As can be seen from a comparative view of FIGS. 2 and 3, all of the permanent magnets 4a and 4b and the segments of the hysteresis material 8 of the permanent-magnet coupling are formed as parallelepipeds. Although particularly high flux densities are achieved and thus particularly high torques can be transmitted by the arrangement provided according to the invention of the permanent magnets 4a and 4b on the first member, the permanent-magnet coupling can be produced particularly cost-effectively through the commercially conventional use of magnets 4a and 4b shaped as bars or segments. An adjustment with respect to the dimensions and/or the torque to be achieved can be done in particular by a simple change of the geometry and equipment with permanent magnets 4a and 4b.

As can be further seen from FIG. 3, as viewed in the axial direction without restriction several rings of permanent magnets 4a and 4b can also be provided, so that further variation possibilities also result thereby with the use of standard components.

Between the first member 1 and the second member 2 a separator can be provided in the form of a containment shell 7, which makes possible a leakage-free separation of the members 1, 2. The usually provided bearing of the members 1 and 2, for example by means of roller bearings, is not shown.

The permanent-magnet coupling shown in FIGS. 1 through 3 is provided for transmitting torque, one of the members 1, 2 being driven and the other member 2 being connected to a load. If for example the inner first member is rotated, the second member 2 rotates with it synchronously due to the forces acting between the permanent magnets 4a and 4b and the hysteresis material 8, until a limit torque determined by the interaction of the permanent magnets 4a and 4b with the hysteresis material 8 is reached. When the limit torque is reached, the forces transmitted through the air gap 3 are no longer sufficient to entrain the second member 2 with the driven first member 1, so that then the permanent-magnet coupling slips. In particular slipping of this type can be used in a targeted manner in order with certain assembly operations to maintain a precisely predetermined torque or also to avoid overload with processing machines or other drives.

With a permanent-magnet coupling for transmitting torque with an inner rotor and an outer rotor free slipping can occur because of the rotation. With an embodiment with a hysteresis material 8 on the second member 2, the resulting advantage is deceleration caused by the magnetic hysteresis losses. The deceleration can thereby be adjusted by the selection of the hysteresis material 8 or variation of the air gap. Embodiments are also conceivable in which the second member 2 has permanent magnets 4c as well as the hysteresis material 8.

Figure 4:
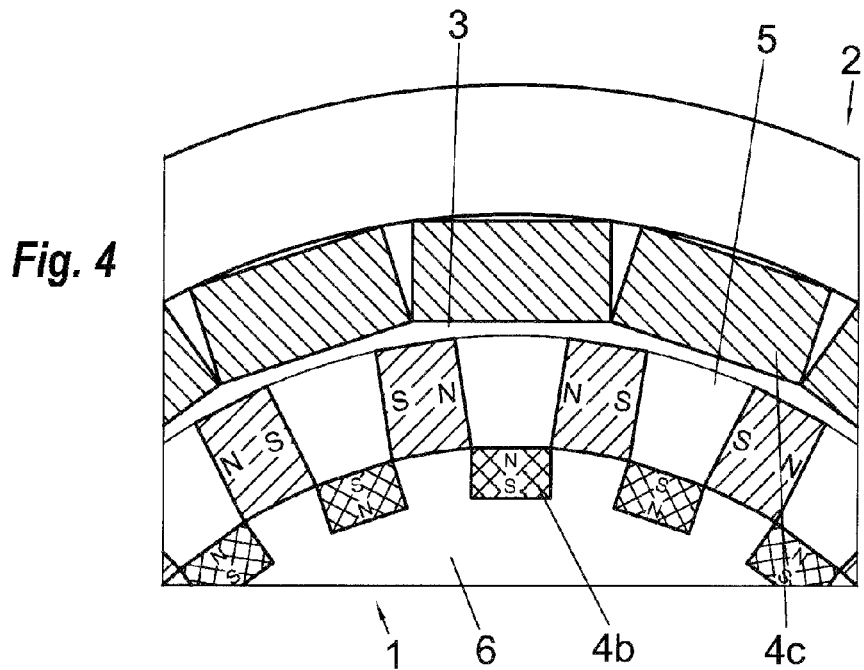
FIGS. 4 and 5 show alternative embodiments of a torque-transmitting permanent-magnet coupling.

FIG. 4 shows an alternative embodiment of a permanent-magnet coupling in which the outer rotor as second member 2 is also equipped with permanent magnets 4c. The inner rotor as first member 1 is provided as with the hysteresis coupling shown in FIGS. 1 through 3. An oppositely polarized permanent magnet 4c of the second member 2 lies opposite each space 5 free of permanent magnets of the first member 1, so that for the inner rotor and the outer rotor as viewed around the circumference an identical pole pitch results. In the illustrated embodiment shown, the permanent magnets 4c of the second member are also formed as rectangular parallelepipeds so that they form a polygon. Alternatively, the permanent magnets 4c can be trapezoidal manner and/or provided on their side facing the air gap 3 with a curvature in order to optimally utilize the available installation space.

Figure 5:
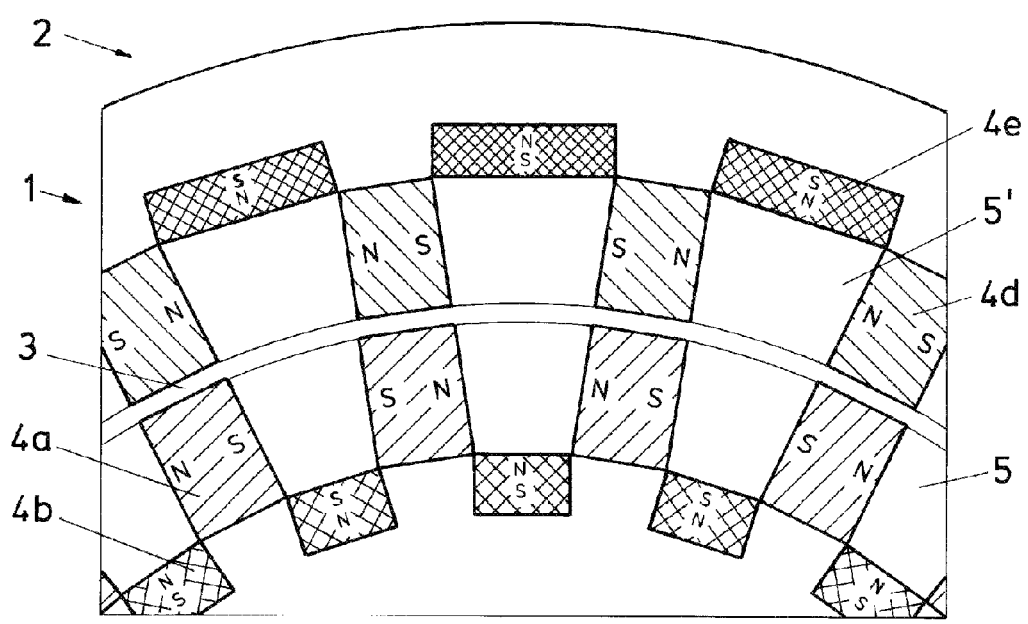

FIG. 5 shows a further embodiment of a permanent-magnet coupling in which the inner rotor as first member 1 is formed as described in connection with FIG. 5. However, the outer rotor as second member 2 has a first array of first permanent magnets 4d and a second array of second permanent magnets 4e. The permanent magnets 4d and 4e are arranged, like in the first member 1, such that spaces 5' free of permanent magnets are formed, and the three faces defining each of the spaces 5' of the surrounding permanent magnets 4d and 4e fit together with their north or their south poles. The spaces 5' are filled with a soft magnetic material, for example, soft iron. The soft iron can be present in the form of laminated electrical-steel sheets.

The invention claimed is:

1. A permanent-magnet coupling for synchronously transmitting torque, the coupling comprising:
    a first member rotatable about an axis and having a first array of rectangularly parallelepipedal first permanent magnets and a second array of rectangularly parallelepipedal second permanent magnets;
    a rotatable second member rotatable about the axis, nested with the first member, and separated by an axially extending air gap therefrom, whereby for synchronous rotation the members are coupled by forces that are generated by the permanent magnets in interaction with the second member, the first permanent magnets having magnetization directions running parallel to the air gap and the second array of second permanent magnets having magnetization directions running perpendicular to the air gap, the first permanent magnets of the first array and the second permanent magnets of the second array of the first member alternating angularly with adjacent first permanent magnets of the first array as well as adjacent second permanent magnets of the second array having opposing magnetization directions, the second permanent magnets of the second array starting from the air gap being set radially back with respect to the first permanent magnets of the first array so as to form between the air gap and each of the second permanent magnets of the second array a spaces free of permanent magnets, angularly delimited by the first permanent magnets of the first array, and extending a full radial height of the first permanent magnets.

2. The permanent-magnet coupling according to claim 1, further comprising:
    filler material in the spaces free of permanent magnets.

3. The permanent-magnet coupling according to claim 1, wherein the second member has permanent magnets that interact with the first and second permanent magnets of the first member.

4. The permanent-magnet coupling according to claim 1, wherein the second member has a magnetizable material that interacts with the first and second permanent magnets of the first member.

5. A permanent-magnet coupling comprising:
an inner member having an outer surface centered on an axis;
an outer member having an inner surface centered on the axis and surrounding and spaced by an annular gap from the inner member, each of the members being rotatable about the axis relative to the other member;
a first annular array of angularly spaced, rectangularly parallelepipedal, and axially extending first permanent magnets forming one of the surfaces and fixed on the respective member, the first permanent magnets being magnetized in an angularly extending direction; and
a second annular array of angularly spaced, rectangularly parallelepipedal, and axially extending second permanent magnets interleaved with the first permanent magnets and spaced radially away from the gap so as to form respective magnet-free spaces open radially into and extending axially along the gap and each defined by a radially directed face of a respective one of the second permanent magnets and by angularly confronting faces of the first permanent magnets flanking the respective second permanent magnet, the second permanent magnets being magnetized in a radially extending direction, the first and second permanent magnets being arrayed such that all the faces defining each space are of the same polarity and the polarity alternates from space to space, the spaces extending a full radial height of the first permanent magnets.

6. The permanent-magnet coupling defined in claim 5, wherein the one member is inside the other member.

7. The permanent-magnet coupling defined in claim 6, wherein the other member is made of magnetically permeable material.

8. The permanent-magnet coupling defined in claim 6, wherein the other member is formed by a third annular array of third permanent magnets.

9. The permanent-magnet coupling defined in claim 5, further comprising nonmagnetic but magnetically permeable bodies filling the spaces.

10. The permanent-magnet coupling defined in claim 4 wherein the magnetizable material is a hysteresis material.

11. The permanent-magnet coupling defined in claim 4, wherein rectangular box-shaped segments form the magnetizable material.

12. The permanent-magnet coupling defined in claim 1, wherein the first and second permanent magnets are axially extending bars of rectangular section seen axially.

13. The permanent-magnet coupling defined in claim 3, wherein the first and second permanent magnets are axially extending bars of rectangular section seen axially.

14. The permanent-magnet coupling defined in claim 1, further comprising:
an inner support member having a cylindrical outer surface in which the second permanent magnets are wholly recessed and on which the first permanent magnets sit and formed as a reflux element of ferromagnetic material.

15. The permanent-magnet coupling defined in claim 5, further comprising:
an inner support member having a cylindrical outer surface in which the second permanent magnets are wholly recessed and on which the first permanent magnets sit and formed as a reflux element of ferromagnetic material.

* * * * *